United States Patent [19]
Todd et al.

[11] 3,994,304
[45] Nov. 30, 1976

[54] BACK-FLOW RETARDING FEED PLATE FOR ROTARY COMBINE

[75] Inventors: Robert R. Todd, Leola; Edward W. Rowland-Hill, Lancaster, both of Pa.

[73] Assignee: Sperry Rand Corporation, New Holland, Pa.

[22] Filed: Jan. 6, 1976

[21] Appl. No.: 646,819

[52] U.S. Cl. .............................................. 130/27 T
[51] Int. Cl.² ...................... A01F 12/18; A01F 7/06
[58] Field of Search ............ 130/27 T, 27 JT, 27 R; 56/14.6

[56] References Cited
UNITED STATES PATENTS

| | | |
|---|---|---|
| 3,648,710 | 3/1972 | Rowland-Hill .................. 130/27 T |
| 3,756,248 | 9/1973 | Mathews ......................... 130/27 JT |
| 3,771,530 | 11/1973 | Wassell ........................... 130/27 JT |
| 3,794,047 | 2/1974 | DeCoene .......................... 130/27 T |
| 3,939,847 | 2/1976 | Straeter ........................... 130/27 T |

*Primary Examiner*—Russell R. Kinsey
*Attorney, Agent, or Firm*—C. Hercus Just; Frank A. Seemar; John R Flanagan

[57] ABSTRACT

A rotary combine having axially extending threshing rotor and coacting concave positioned to receive crop material to be threshed from auger means on the forward end of the rotor, and an elevator which extends upward and rearward from a header to the auger means delivers the crop material to an upwardly and rearwardly extending feed plate which guides the crop material upwardly in an undershot manner to said auger means. Several embodiments of a grain trapping and back-flow retarding plate are associated adjustably with said feed plate to permit discharge of threshed crop material and prevent tendencies for the material being fed upward along the feed plate to slide back down the same toward the elevator.

9 Claims, 7 Drawing Figures

3,994,304

BACK-FLOW RETARDING FEED PLATE FOR ROTARY COMBINE

CROSS REFERENCE TO RELATED APPLICATION

The invention comprising the present application is related to the invention in pending application Ser. No. 561,406, filed Mar. 24, 1975 and now U.S. Pat. No. 3,939,847, and entitled "Combine with Improved Feed Plate".

BACKGROUND OF THE INVENTION

The present invention pertains to a combine of the axial flow type in which, preferably, a pair of rotors having rasp bars thereon are mounted within a casing and are rotatable in opposite rotary directions repectively for coaction with arcuate, stationary concaves. Auger means are provided on the forward ends of said rotors for purposes of positively feeding crop material to the inlet end of the threshing compartment between said rotors and concaves. An elevator is on the forward end of said combine and extends upwardly and rearwardly from a header which cuts and consolidates the crop material and delivers it to the lower end of said elevator. The elevator moves the crop material upwardly and rearwardly to the lower portions of the auger means which feeds the material to the threshing elements in a somewhat undershot manner.

A feed plate extends upwardly and rearwardly from the upper end of the elevator to the forward end of said concaves to guide the crop material from the elevator to the auger means and the forward end of the threshing compartment. It has been found that when crop material is fed up such feed plate, there are several undesirable results, especially when the combine is harvesting certain types of crops. These undesirable results include: (1) a tendency for the crop material to slide back down the feed plate and thus tend to obstruct the upward delivery movement of oncoming material from the elevator and thereby retard the feeding function of the elevator; (2) a second undesirable result is that it has been found that there is a limited amount of threshing of the seeds, grains and kernels from the crop material when engaged by the auger means and this threshed material also tends to slide downwardly along the feed plate, whereby a certain amount of such threshed material falls upon the ground and thus is lost; (3) another undesirable result is that the grain threshed by the auger will be subject to possible damage if it is permitted to pass through to the threshing compartment, because threshed grain is unprotected in comparison to the crop material for which the threshing mechanism is designed and, therefore, particularly susceptible to damage; and (4) still another undesirable result is caused by the buildup of loose material at the transition between the feed plate and elevator causing blockage and potential back-feeding down the top of the elevator to the header under some crop conditions.

A typical example of axial flow type combine to which the present invention pertains is illustrated in U.S. Pat. No. 3,848,609, issued Nov. 19, 1974, to Mortier et al, and entitled "Axial Flow Type Harvesting Machines". In said patent, it will be seen that the elevator delivers crop material to an upwardly and forwardly extending feed plate which appears to be at an angle of at least approximately 30° relative to a horizontal plane, said feed plate being below the auger means on the forward ends of the rotors. Such combine is not provided with any means to retard or restrict such downward movement of some of the crop material in a back-feeding direction or in providing means to retain grain threshed by the auger means and, therefore, it is the principal object of the present invention to provide means at least to minimize, if not eliminate such back-feeding tendency and loss of grain threshed by the auger means, as well as to facilitate release of threshed grain before it receives damaging impacts from the threshing mechanism, details of which are set forth below.

SUMMARY OF THE INVENTION

It is one of the principal objects of the present invention to provide in an axial flow type rotary combine of the type referred to above, means on the upwardly and rearwardly extending feed plate arrangement which is operable to minimize tendencies for crop material from sliding back down said feed plate and thus impeding the upward movement of crop material which is advanced by the elevator of the combine.

It is another important object of the present invention to provide in association with the feed plate arrangement of the type described above, means by which crop material which is threshed prior to being engaged by the threshing elements of the combine may be caught and discharged onto the conventional grain-receiving means of such combine, said grain retaining means being commonly known as a grain pan.

It is a further object of the invention to revise the conventional feed plate of a combine of the type referred to by forming therein between the opposite side edges thereof and also between the upper and lower edges thereof, a transversely extending, rectangular opening or slot, and a door-like plate is hingedly connected at one edge to the upper edge of said slot, said plate being movable about the axis of the hinge to dispose the plate either within the plane of the stationary feed plate or more the lower, forward edge of said door-like plate downwardly to provide a recess which is wedge-shaped in cross section which serves two beneficial purposes, namely, (1) if crop material moving up said feed plate by the oncoming material delivered by the elevator tends to slide backward, it will move into said recess and downward movement will be stopped, and (2) such position of the door-like plate referred to above will also provide a transversely extending slot through which threshed crop material may fall downwardly onto the grain receiving means comprising a grain pan, for example.

Still another object of the invention is to provide said door-like plate with perforations or a pattern of similar openings which extends transversely across said door-like plate, the size of said openings being adequate to permit passage of threshed material of the type being harvested by the combine at any given time, it being a further object of the invention to provide a limited number of such door-like plates which are interchangeable with each other and respectively provided with openings of different sized adapted to suit different types of crops from substantially the smallest to the largest which normally are harvested by combines of the type embodying the present invention.

One further object of the invention is to provide a removable bar on the forward lower edge of said door-like plate which, in conjunction with said plate, affords a shape and area corresponding to that of the opening in the upwardly and rearwardly extending feed plate, whereby when said bar is removed and the door-like plate is disposed within opening, a slot is provided through which threshed grain may fall onto said grain receiving means such as a grain pan.

Still another object of the invention is to affix to the lower edge of said opening in said upwardly and rearwardly extending guide plate a downwardly extending flange which coacts with said door-like plate when in a lowered position to effect the reception or trapping of any crop material tending to slide downwardly along said feed plate and said flange further cooperating with the lower, forward edge of said door-like plate to define a slot through which threshed crop material may drop onto said crop-receiving means.

A still further object of the invention is to provide means by which the door-like plate may be secured in adjusted position with respect to the opening in the feed plate with which it is associsated, said adjustment-maintaining means comprising wings extending downward from the feed plate adjacent opposite ends of the slot therein, and arcuate slots being formed in said wings for the reception of threaded pins fixed to opposite ends of said door-like plate and disposed within said slots, whereby nuts threaded onto said pin may secure said door-like plate in a desired position of adjustment.

Details of the foregoing objects and of the invention, as well as other objects thereof, are set forth in the following specification and illustrated in the accompanying drawings comprising a part thereof.

DETAILED DESCRIPTION

Figure 1:
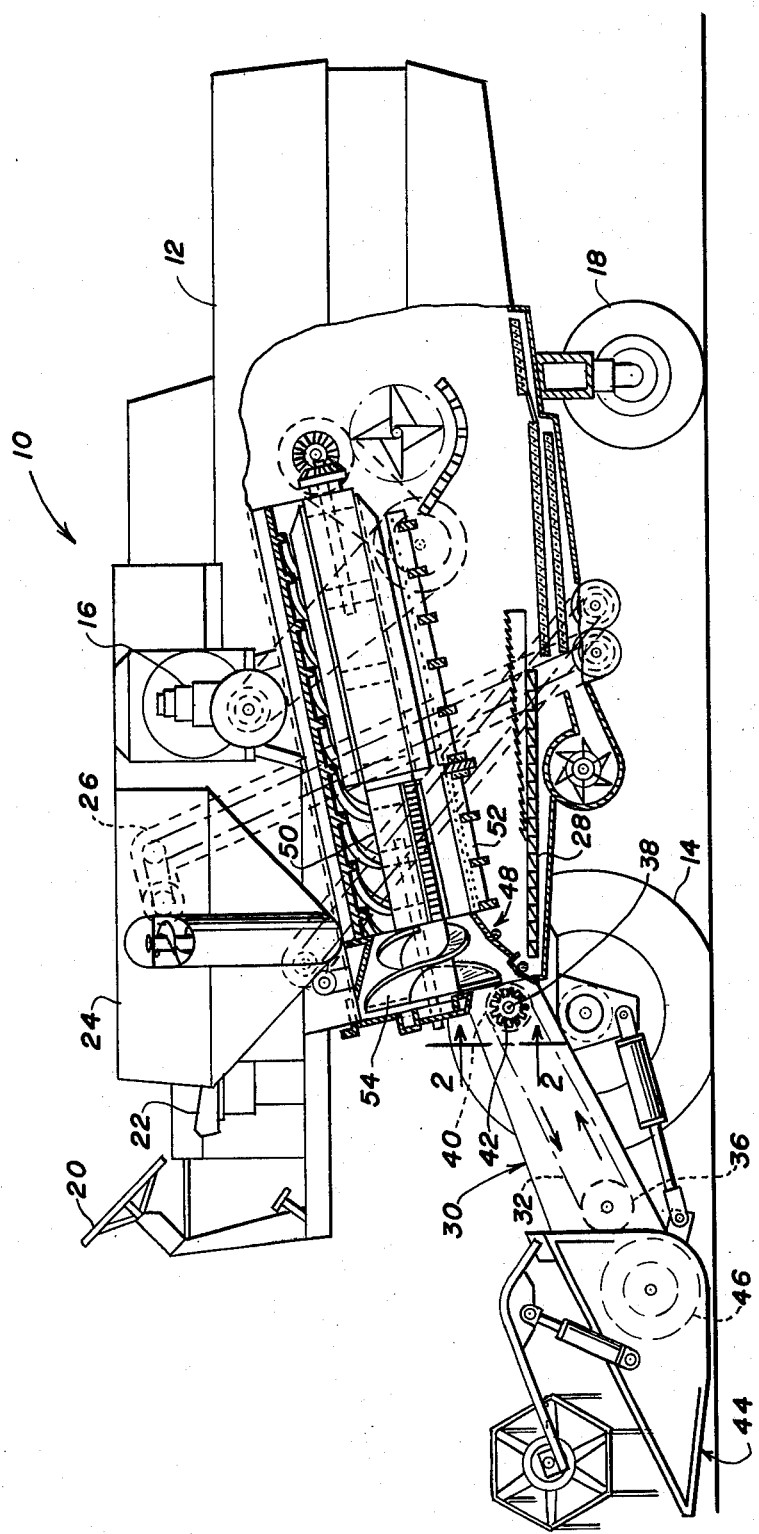
FIG. 1 is a side elevation of an exemplary rotary combine of the axial flow type, part of the combine being broken away to illustrate details thereof with which the present invention is concerned.

The combine 10 shown in FIG. 1 comprises an overall housing 12 which encloses a rigid frame, not shown, supported by a pair of large, traction wheels 14 which are power driven by a diesel engine 16 of substantial horsepower rating. The traction wheels 14 are adjacent the forward end of the combine 10 and, rearwardly thereof, a pair of smaller wheels 18 are mounted, only one of the same being shown in view of the fact that the housing 12 is central of the pairs of wheels 14 and 18 and it is desired that the interior of the housing 12 be illustrated in said figure, whereby the nearer wheels 14 and 16 are omitted from said figure. The wheels 18 are adapted to be moved about vertical axes by means of the steering wheel 20 which is actuated by an operator of the combine while seated upon the seat 22.

A grain bin 24 also is supported in the upper portion of the combine 10. This receives grain from elevating means 26. A grain pan 28 is located in the lower portion of the housing 12 and discharges onto the lower end of the elevating means 26 which moves the threshed crop material to the grain bin 24.

Figure 3:
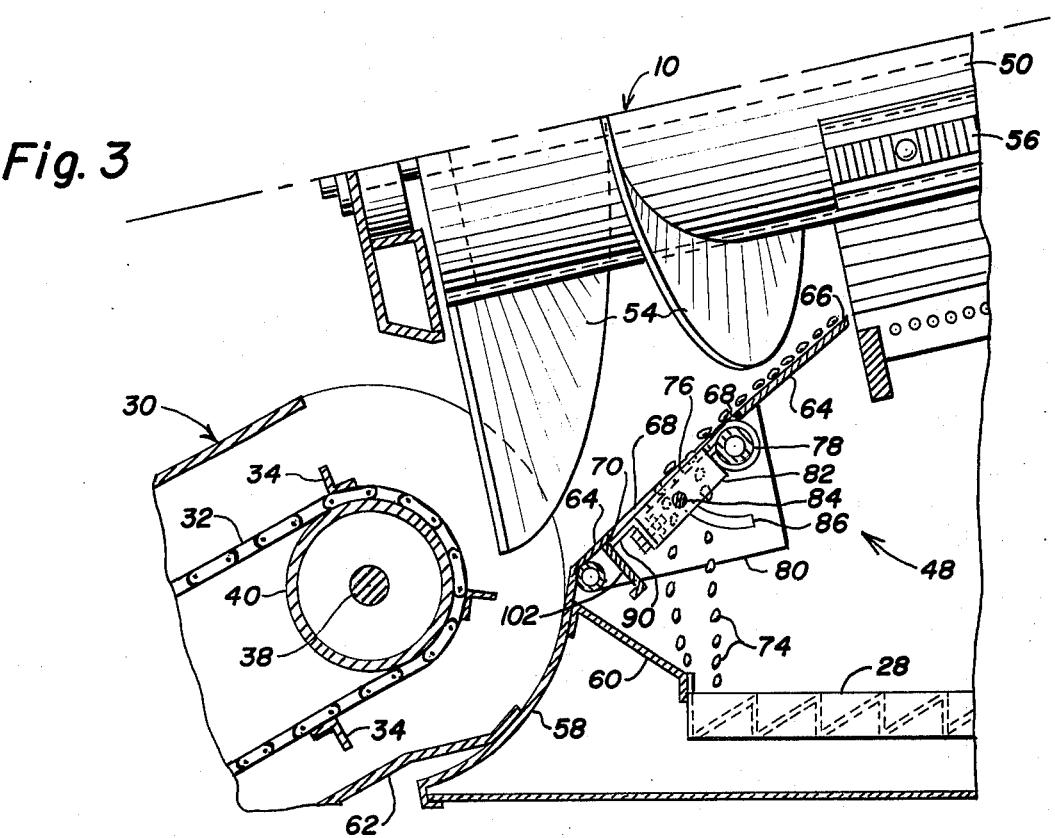
FIG. 3 is another fragmentary, vertical sectional view showing details of the combine to which the present invention pertains as seen on the line 3—3 of FIG. 2.

Extending forwardly and downwardly from the forward end of the longitudinally extending housing 12 of the combine is a conventional crop elevator 30 which comprises a plurality of transversely spaced, endless, flexible belts 32, between whih transverse cross bars 34 extend, see FIG. 3. The belts 32 extend around a lower, forward supporting cylinder or set of sprockets 36 mounted upon a transverse shaft and the upper end of the elevator 30 has another transverse shaft 38 which extends between opposite sides of the crop elevator 30 to support either a drum or a series of sprockets 40. A driving sprocket 42 is mounted on one end of the shaft 38 for actuation by a suitable sprocket chain, not shown, which derives power from the diesel engine 16.

The forward end of the frame embodied in the crop elevator 30 supports a forward header 44 of conventional type which cuts the crop material, moves it rearwardly, and a pair of oppositely spiralled augers 46 consolidates the relatively wide swath of cut material into a much narrower band thereof which is continuously moved upward and rearwardly by the crop elevator 30, along the lower surface of the housing of said elevator, for an undershot type of delivery at the upper end of the elevator to the feed plate arrangement 48 which is of the composite nature and embodies a number of features of the present invention. From FIGS. 1–5, it will be seen that said feed plate arrangement extend upwardly and rearwardly from the upper end of the crop elevator 30, at an acute angle to the horizontal, to the inlet end of the rotor 50 and concave 52 which are generally axial of the housing 12 of the combine 10 and comprise a generally fore-and-aft type of threshing and separating mechanism to which the crop material is forcibly fed by auger means 54 mounted upon the forward ends of the rotors 50. The rotor 50 also supports a plurality of rasp bars 56, see FIGS. 2 and 3, which co-act with the longitudinally extending bars of the arcuate concaves 52. It also will be seen from FIG. 2, that a pair of augers 54, as well as a pair of rotors 50 and co-acting concaves 52 are mounted in parallel relationship with each other, the augers and rotors rotating in opposite rotary directions as shown by the indicating arrows in FIG. 2. It is to be understood, however, that the principles of the present invention may be applied to other arrangements of auger, rotor and concave means.

Attention is now directed to FIGS. 3–7 in which details of the feed plate arrangement 48 are best illustrated. Said feed plate arrangement comprises an arcuate transverse shield 58 which extends between opposite sides of the housing of the crop elevator 30 and terminates directly below the forward portion of the auger means 54. The upper portion of the shield 58 also is fixed to a rearward and downwardly extending additional member 60 which is connected to the forward end of the grain pan 28. This member functions to seal off the area in the vicinity of the front edge of pan 28, and comprises a flexible rubber/fabric material such as tire carcass affixed between the moving pan and shield 58. It will be seen that the fragmentarily illustrated upper end portion of the lower plate 62 of the housing of crop elevator 30 engages the inner surface of the transverse shield 58 so as to permit no leakage of grain or other type of crop product therefrom for discharge onto the ground unless the same slides down the lower plate 62. The upper end of shield 58 engages the lower, forward edge of a stationary feed plate 64, the upper edge 66 of which is immediately adjacent the forward end of the concaves 52, it being understood that the feed plate 64 extends between opposite sides of the housing 12 of the combine. Hence, it will be seen that the feed plate 64 leads directly to the inlet end of the threshing and separating compartment between the rotors 50 and the concaves 52. It also will be seen that the feed plate 64, especially the transverse shield 58, extends upwardly at a substantial angle, whereby it has been found that, especially when threshing certain crop material which lack the structural strength, mass or density to push the concentration of the material into close proximity of the rotating augers, especially at the sides and center section of the threshing means when employing twin rotors, augers and concaves, there is a tendency for portions of the crop material to slide backward, down the incline of the feed plate 64 and shield 58 and along the lower plate 62 of the housing of the crop elevator 30, thereby interferring with the material being continuously moved upward and rearward by the elevator 30.

To counteract and especially to minimize or, preferably, eliminate such tendency for backward movement of the material, the present invention includes the following improvements.

Figure 2:
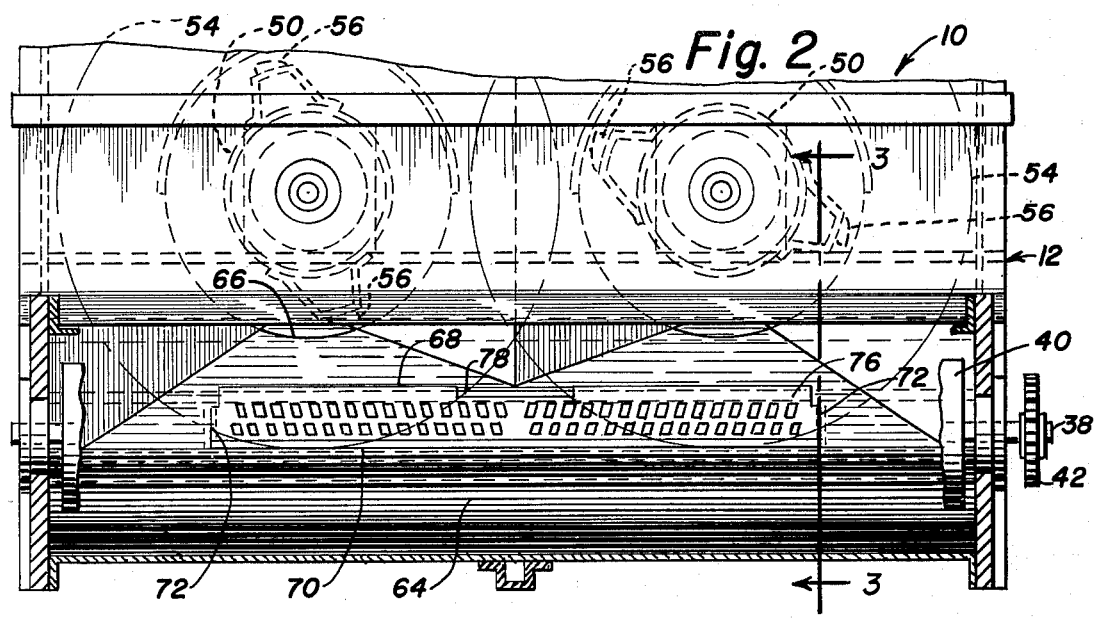
FIG. 2 is a fragmentary, partially sectioned view showing the inlet end of the threshing compartment of the combine as seen on the line 2—2 of FIG. 1.

The feed plate 64 is provided with a transversely extending opening 68 which is best shown in outline in FIG. 2, and the same having a forward, lower edge 70. Said opening also has opposite side edges 72 shown in FIG. 2, whereby it will be seen that the opening is of ample width to serve two principle objectives; one of these being to prevent or substantially minimize the downward, reverse sliding movement of crop material down the feed plate arrangement 48, and also provide means by which threshed crop material, which is separated from the cut crop material incident to being engaged by the auger means 54 for example, to pass onto the forward end of the grain pan 28, exemplary threshed crop material 74, such as grain, being shown diagrammatically in FIG. 3. Under circumstances where such threshing has occurred heretofore in similar situations, the grain has moved down the crop elevator 30 and has either impeded the upward movement of crop material or is discharged from the lower end of the elevator onto the ground and thus is wasted.

Figure 6:
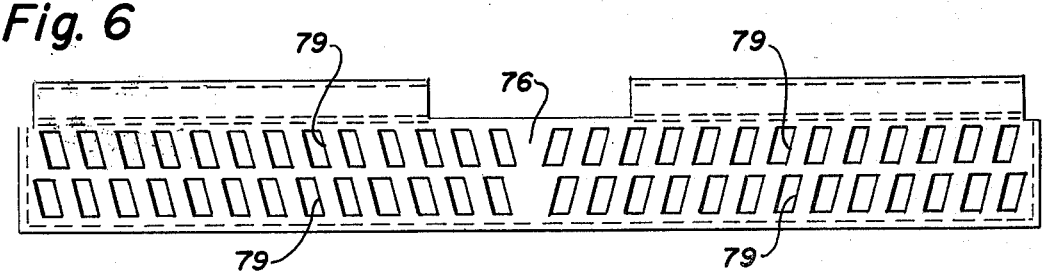
FIG. 6 is a plane view of a door-like plate of the feed plate arrangement provided with openings therein permitting the passage of grain therethrough and adapted to be substituted for a solid type plate when desired.

Several embodiments of means are employed with respect to the transverse opening 68. One of these is shown in FIGS. 2, 3 and 6, wherein a door-like plate 76 is illustrated which is provided with a plurality of holes 79 which are of adequate size to permit the ready passage of threshed crop material therethrough in accordance with the size of the seeds, grains or kernels of the material being threshed. Accordingly, it is preferred that a plurality of the plates 76 be available, respectively having holes 79 of different sizes corresponding to the crop material being threshed. The upper, rearward edge of the plate 76 is pivotally supported by a transverse pivot shaft 78 which extendss between a pair of wings 80 which are fixed to and extend downward from the lower surface of the feed plate 64 respectively adjacent opposite ends of the transverse opening 68 in plate 64. The opposite ends of the door-like plate 76 have downwardly turned end members 82 thereon which are apertured for purposes of receiving bolts 84, said bolts also intersecting arcuate slots 86 and have nuts 88 threaded thereon, whereby upon tightening the nuts 88, a desired angular position of the door-like plate 76 with respect to the opening 68 in feed plate 64 may be maintained for the following purposes.

Figure 4:
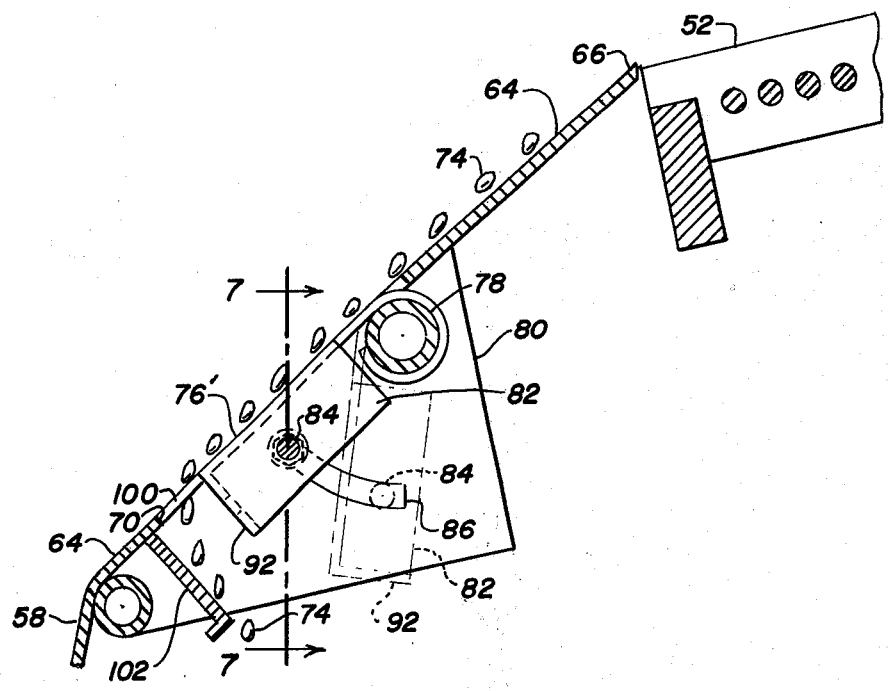
FIG. 4 is a vertical sectional view of a still further enlarged detail of the feed plate arrangement of the present invention as seen in the lower right hand portion of FIG. 3 and illustrating the adjustable door-like plate thereof in several adjusted positions, respectively, shown in full lines and phantom, to illustrate the versality thereof and also showing one type of grain discharge opening.
Figure 5:
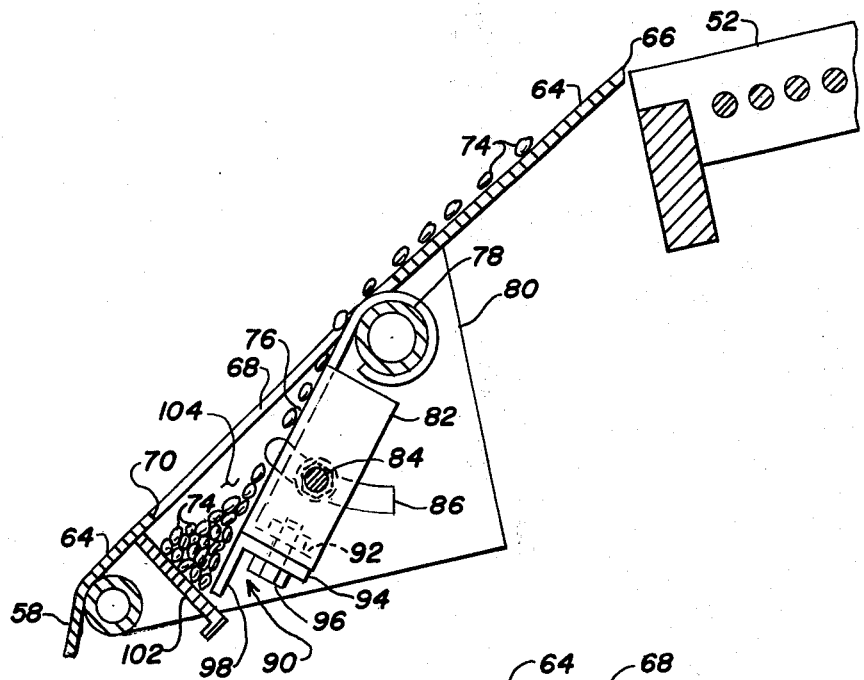
FIG. 5 is a view similar to FIG. 4 but showing a further type of grain discharge opening comprising a removable extension on the door-like plate of said feed plate arrangement.
Figure 7:
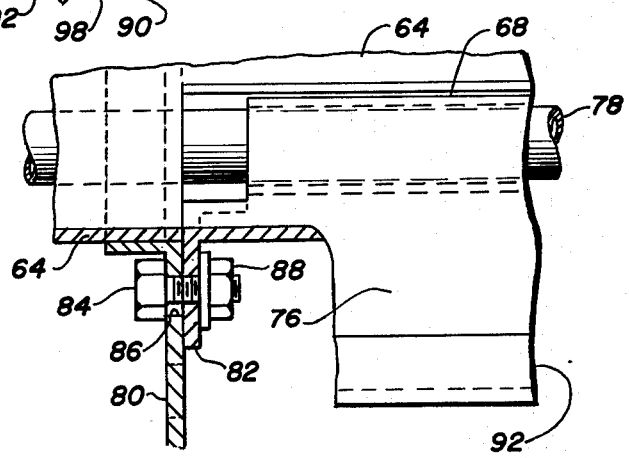
FIG. 7 is a fragmentary vertical sectional view of one end of said feed plate arrangement and door-like plate thereof as seen on the line 7—7 of FIG. 4.

From FIGS. 4 and 5 in particular, it will be seen that the forward, lower edge of door-like plate 76 has a removable angle bar 90 connected to a perpendicular flange 92 which extends along the lower, forward edge of plate 76, whereby one flange 94 of angle bar 90 is coextensive with the flange 92 and is removably connectable thereto by a plurality of bolts 96. The other flange 98 of angle bar 90 actually forms a continuation of the plate 76 as can be best seen in FIG. 5. The combined width of the plate 76 and flange 98 of angle bar 90, considered in a direction perpendicular to the axis of pivot shaft 78, preferably is slightly greater than the corresponding width of the transverse opening 68, whereby when the door-like plate 76 is disposed in closed position with respect to opening 68 as seen in FIG. 3, the terminal edge of flange 98 will engage the lower surface of feed plate 64 adjacent the lower edge 70 of opening 68 and abut the same. Accordingly, if the plate 76 is of the type shown in FIG. 6, any threshed product material which slides down the plate 64 will pass through the openings 79 in plate 76 and fall onto the grain pan 28.

It also is contemplated within the purview of the present invention that an imperforate plate 76' may be employed, as illustrated in FIG. 4 in full lines in so-called closed position, and in phantom, in open position. Even when in closed position shown in full lines in said figure; however, when the angle bar 90 is removed, the lower portion 100 of transverse opening 68, adjacent the lower edge 70 of opening 68, is open and thereby forms a relatively narrow slot through which the grain or other threshed product 74 may fall.

The invention also includes a further transverse flange 102 which extends substantially perpendicular to the lower surface of the feed plate 64 immediately adjacent the lower edge 70 of transverse opening 68, said flange preferably having a perpendicular terminal edge to strengthen and rigidfy said flange. Said flange has several important functions, one of these being to form a wall of a recess 104 which otherwise is defined by the door-like plate 76 when the latter is disposed in a selected open position such as shown in exemplary manner in FIG. 5. Said recess is capable of receiving at least a limited amount of crop material which may tend otherwise to slide down feed plate 64, opposite the desired feeding direction thereof, and the reception of such material in the cavity 104 will serve to minimize or prevent such backward, downward movement of the material, especially under circumstances where there is limited bulk of the material to insure continuous upward and rearward feeding movement of the material along the feed plate 64.

A second function of the transverse flange 102 is to cooperate with the terminal edge of the other flange 98 of angle bar 90 and provide a space through which threshed crop material may fall onto the grain pan 28. Accordingly, it will be seen that different positions of the door-like plate 76 with respect to transverse flange 102 will provide passage slots of different widths, as desired to suit the type of crop material being threshed.

From the foregoing it, therefore, will be seen that the present invention provides means for either substantially minimizing or eliminating the tendency for crop materials to slide backward from the intended feeding direction thereof when moving along the feed plate 64 by providing angular adjustment of the door-like plate 76 relative to the transverse opening 68 in the feed plate 64 to form the recess 104 which operates to receive certain amounts of downwardly sliding material and halt such action and providing possiblilities of forming a build-up of said material and thereby prevent any downward movement of additional material, particularly until such time as oncoming masses of the crop material will tend to move the material which has accumulated in the recess 104 upwardly to the inlet of the threshing and separating compartment of the combine. In addition, material which is threshed by the action of the augers 54, or otherwise, prior to the crop material being engaged by the threshing rotor and concave means, is permitted to fall onto the grain pan by passage through either the openings 79 in the door-like plate 76 and/or the transverse slot 100 which is provided when the angle bar 90 is removed, or the slot between flange 102 and the terminal edge of flange 98 of angle bar 90 when the door-like plate 76 has been moved to one or more open positions.

While the invention has been described and illustrated in its several preferred embodiments, it should be understood that the invention is not to be limited to the precise details herein illustrated and described since the same may be carried out in other wasy falling within the scope of the invention as illustrated and described.

Having thus described the invention, what is claimed is:

1. In an axial flow type rotary combine:
  a. a casing extending longitudinally thereof and having a forward end and generally fore-and-aft type threshing and separating mechanism therein comprising;
  b. rotor means extending longitudinally and rearwardly from said forward end within said casing for rotary movement and having rasp bars thereon,
  c. a concave supported within said casing coaxially with said rotor means to form threshing mechanism,
  d. auger means connected to the forward end of said rotor means
  e. an elevator connected to the forward end of said casing and extending upwardly and rearwardly from a header at the lower end of said elevator toward said auger means, and
  f. a feed plate arrangement supported within said casing and extending upwardly and rearwardly therein between the upper rearward end of said elevator and the forward end of said concave to guide crop material upwardly and rearwardly along said feed plate arrangement to be engaged by said auger means to feed said material positively to the threshing mechanism; in combination with:
  g. passage means on said upwardly and rearwardly extending feed plate arrangement and operable to permit threshed material to pass therethrough and thereby minimize tendencies for crop material from sliding back down said feed plate arrangement toward said elevator and prevent any appreciable impeding of the upward feeding of crop material to said auger means and threshing mechanism from said elevator, and
  h. grain receiving means beneath said feed plate arrangement to accept threshed material falling through said passage means.

2. The combine according to claim 1 in which said feed plate arrangement comprises a plate extending from the center of said arrangement toward the opposite sides of said casing and having a series of openings therein arranged within a pattern extending between the opposite sides thereof and above said grain receiving means.

3. The combine according to claim 1 in which said feed plate arrangement comprises an upwardly and rearwardly extending plate supported transversely between opposite sides of said casing and having a transversely extending opening therein, and a door-like plate extending across said opening and movably supported relative thereto adjustably form a passage opening between said door-like plate and one edge of said transverse opening to permit passage of threshed grain therethrough.

4. The combine according to claim 3 in which said door-like plate has a pattern of holes therein of sufficient size to pass threshed crop material therethrough.

5. The combine according to claim 3 in which said door-like plate is hingedly connected along the upper rearward edge thereof relative to the upper edge of said transversely extending opening and is arranged for the lower forward edge of said door-like plate to be moved pre-determined variable distances downwardly away from said upwardly and rearwardly extending plate to form a discharge slot-like opening through which crop material threshed by said auger means or otherwise may pass to said grain receiving means.

6. The combine according to claim 5 further including a flange extending downwardly from said lower edge of said transversely extending opening and cooperating with said door-like plate when the lower forward edge thereof is lowered to form a recess trap adapted to receive crop material and at least minimize tendencies for crop material to slide down said feed plate arrangement as well as provide a passage for any threshed crop material as aforesaid.

7. The combine according to claim 6 further including a bar extending across and removably attached to the forward lower edge of said door-like plate and comprising an extension of said edge to extend to the forward lower edge of said transversely extending opening when said door-like plate is in closed position relative to said opening, said bar when removed decreasing the size of said door-like plate and thereby providing a slot between one edge of said slot and plate through which threshed crop material may pass when said plate is in closed position.

8. The combine according to claim 5 further including wing members connected to said upwardly and rearwardly extending plate adjacent the opposite ends of said transversely extending opening therein, said wing members being engaged respectively by the opposite ends of said door-like plate when pivotally moved downwardly to form said slot-like opening, and maintaining means between said wing members and door-like plate operable to maintain said door-like plate in desired adjusted position relative to said transversely extending opening.

9. The combine according to claim 8 in which said maintaining means comprise arcuate slots in said wing members and threaded bolts carried by transverse members on opposite ends of said door-like plate adjustably movable within said slots, and nuts on said bolts operable to secure said door-like plate in desired adjusted position relative to said transversely extending opening.

* * * * *